RECORDING METHOD AND DEVICE

Filed Oct. 26, 1966 3 Sheets-Sheet 1

INVENTORS
JOHN GUZAK, JR.
GEORGE E. MISTHOS
DONALD J. STEFANIK

BY Strauch, Nolan, Neale, Nies & Bronaugh
ATTORNEYS

RECORDING METHOD AND DEVICE

INVENTORS
JOHN GUZAK, JR.
GEORGE E. MISTHOS
DONALD J. STEFANIK

BY
Strauch, Nolan, Neale, Nies & Bronaugh
ATTORNEYS

INVENTORS
JOHN GUZAK, JR.
GEORGE E. MISTHOS
DONALD J. STEFANIK
Strauch, Nolan, Neale, Nies & Bronaugh
ATTORNEYS United States Patent Office
3,514,536
Patented May 26, 1970

3,514,536
RECORDING METHOD AND DEVICE

John Guzak, Jr., Waukegan, George E. Misthos, Glenview, and Donald J. Stefanik, Berwyn, Ill., assignors to SCM Corporation, New York, N.Y., a corporation of New York Filed Oct. 26, 1966, Ser. No. 589,600
Int. Cl. H041 15/34
U.S. Cl. 178—23 15 Claims

ABSTRACT OF THE DISCLOSURE

There is disclosed a recorder including first and second recording members, the first recording member being subject to deviations in speed, and a proportional time delay circuit responsive to both an input signal and to a cyclical signal which is proportional to the speed of the first recording member for automatically regulating the time of initiation of the recording member in dependence on the magnitude of speed deviations.

The present invention relates to improvements in recording devices and more particularly to improvements in high speed printing devices. In various parts of the world, the voltage and frequency of the available electric power supplies can fluctuate quite erratically. This is due to a variety of reasons such as overloading of the small or limited power producing facilities or the use of antiquated and obsolete power producing facilities in less progressive areas. In electrically dependent data handling and communicating systems, many recording devices such as teleprinter machines, are employed. Voltage and/or frequency fluctuations have a very adverse effect on the quality of the record produced by such devices and machines. For example, during the course of communications transmission, the voltage output of a power producing station may drop from 110 volts to 80 volts without warning due to overload on the system or other familiar causes.

Teleprinter machines and similar recording devices embody a continuously rotating recording member such as a print wheel or print drum which is subject to speed deviations and a second recording member such as a print hammer mounted for movement in a constant time interval between an inactive or rest position and an active position in which it coacts with the first recording member to produce a record. The continuously rotating recording member such as the print wheel is motor driven so that variations in the frequency or voltage from the available power supply will produce variations in the speed of the motor and therefore variations in the speed of the continuously rotating recording member such as the print wheel. The coacting recording member such as the print hammer however has a constant actuating time which is independent of the speed of the motor driving the continuously rotating recording member. The time of actuation of the print hammer or like recording member should be synchronized with the continuously rotating recording member to minimize distortion in the record. Specifically, in a high speed printer the motor may slow down as for example when the frequency or voltage drops. When the printer motor slows down to such a degree that complete registry between the print hammer and the type wheel is not achieved, only the upper portions of the selected characters may be printed due to the fact that the print hammer arrives at the print station too early to completely register with the selected character. Conversely, when the printer motor speeds up to such a degree that complete registry between the print hammer and the type wheel is not achieved, only the lower portions of the selected characters may be printed due to the fact that the print hammer arrives at the print station too late to completely register with the selected character.

In accordance with the invention, there is provided a method of and apparatus for producing an intelligible record which involves moving recording elements in a path at a preselected speed, moving a recording member from an inactive position to an active position with respect to a selected recording element to produce a record, synchronizing the time of actuation of the recording member with respect to the position of a selected recording element, continuously sensing deviations in speed from the preselected speed of the recording elements, and continuously and automatically regulating the time of actuation of the recording member in direct proportion to speed deviations.

With the foregoing considerations in view, it is the principal object of the invention to provide an improved recording device such as a teleprinter and the like for carrying out the method of the invention in which variations in the speed of the continuously rotating recording member are sensed and the time of initiation of actuation of the constant time interval recording member coacting therewith is compensated accordingly to thereby eliminate motor speed deviation or fluctuation induced recording distortion caused by smearing or partially printed characters.

Another object of this invention is to provide a recording device such as a teleprinter or the like embodying a proportional time delay circuit capable of measuring the duration of timing pulses synchronized with the speed of rotation of the continuously rotating recording member and operative to control the initiation of operation of the constant time interval recording member to create synchronization between the two recording members regardless of deviation in the speed of the motor which drives the continuously rotating recording member.

Still another object of this invention is to provide an improved teleprinter embodying a circuit capable of detecting variations in the width of a clock pulse which is totally dependent upon the type wheel speed and triggering a print hammer accordingly to arrive at its true impact position in registry with respect to the type wheel regardless of motor speed fluctuations.

These and other objects of the present invention will become more fully apparent by reference to the appended claims and as the following detailed description proceeds in reference to the accompanying drawings wherein:

Figures 1, 2, 3, 4:
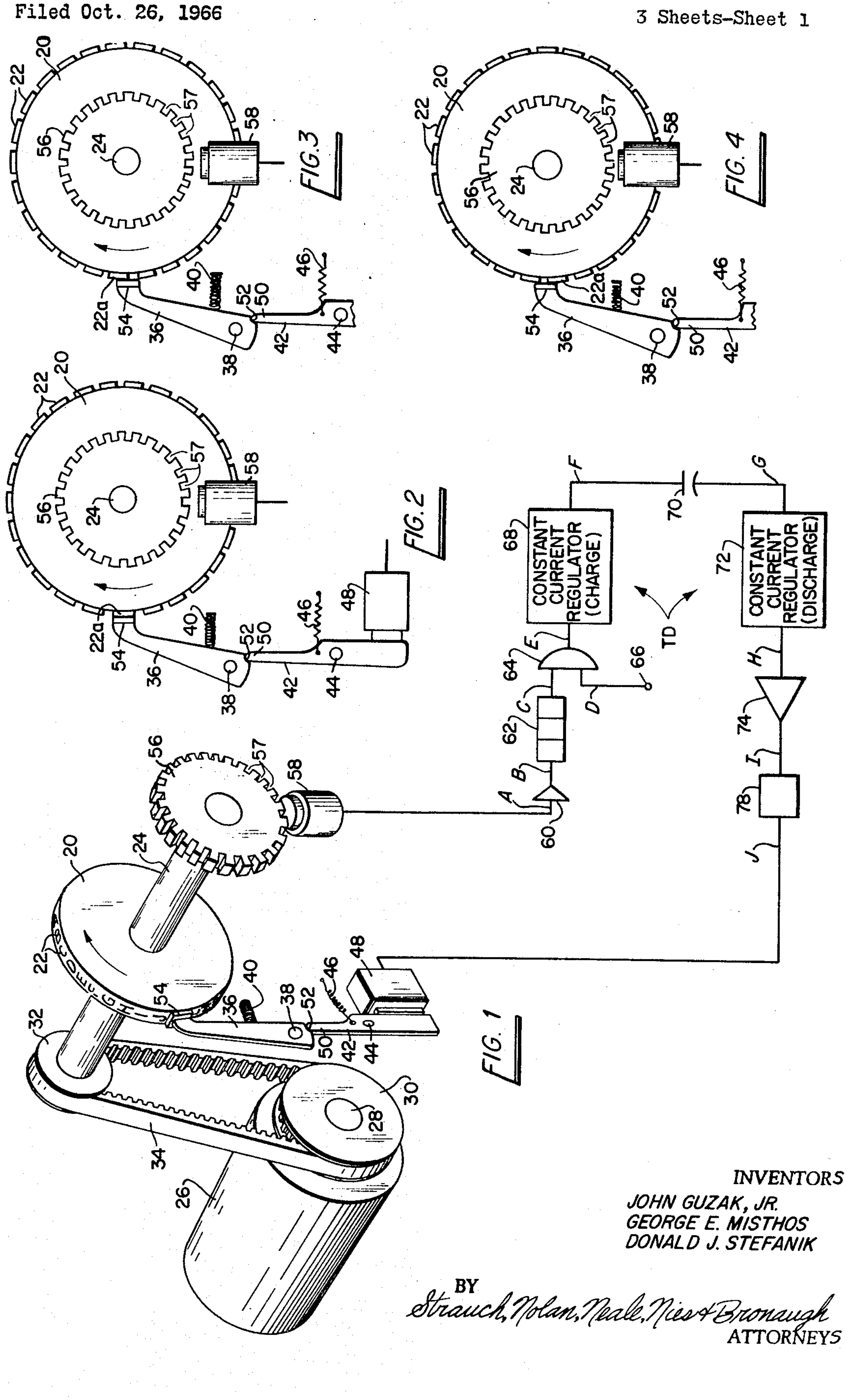
FIG. 1 is a diagrammatic illustration of a teleprinter recording apparatus for carrying out the method of the present invention.
FIG. 2 is a diagrammatic view illustrating a hammer and type wheel in complete registry.
FIG. 3 is a view similar to FIG. 2 but showing the hammer arriving late at the print station.
FIG. 4 is a view similar to FIG. 2 but showing the hammer arriving early at the print station.

Referring now in detail to the drawings and particularly to FIG. 1, there is therein diagrammatically illustrated the basic components of a typical teleprinter recording apparatus. Such an apparatus embodies a type wheel or drum 20 on the periphery of which is embossed a series of recording elements shown to take the form of type characters 22 such as the letters of the alphabet. The type wheel 20 is fixed for rotation with a shaft 24 journalled upon suitable bearings (not shown), driven by an electric motor 26 to move the recording elements in a circular path. If desired, the recording elements, particularly the type characters 22, can be carried by an endless belt with which the clock wheel 56 is synchronized, in which event the path of movement of the recording elements is not circular. Depending upon the available power supply, motor 26 may be either an alternating current, a direct current, or a universal motor. It is shown to be drive connected to the type wheel 20 through a suitable drive train such as its output shaft 28 arranged in parallel relation to the shaft 24, a pulley 30 fixed to shaft 28, a pulley 32 fixed to shaft 24 and a belt 34 interconnecting pulleys 30 and 32.

Coacting with the characters 22 on the periphery of the type wheel 20 is a print hammer 36 pivotally mounted upon a shaft 38, resiliently biased in a counterclockwise direction about the shaft 38 by a compressed coil spring 40 out of engagement with the type wheel 20. An armature 42 pivotally mounted upon a shaft 44 is resiliently biased in a clockwise direction about the shaft 44 by a coil spring 46 and is actuated by energization of a print magnet 48. The tip 50 of the armature 42 engages pivotally a notch 52 in the lower end of the print hammer 36. So long as the magnet 48 remains deenergized, the spring 46 holds the armature 42 in a clockwise direction and the spring 40 holds print hammer 36 in a counterclockwise direction about the respective pivot shafts 44 and 38. Upon energization of the print magnet 48, the armature 42 pivots in a counterclockwise direction and the print hammer 36 in a clockwise direction. Clockwise movement of the print hammer 36 brings its head 54 into impact engagement with a sheet of paper or other record medium interposed between the head 54 and the embossed characters 22 on the periphery of the type wheel 20 to reproduce the image of the impacted character upon the paper thereby producing the record.

To synchronize the time of energization of the magnet 48 with the position of the selected character 22 on the type wheel 20, a clock wheel 56 is fixed to the shaft 24. The clock wheel 56 has one notch 57 in its periphery corresponding to each character 22 of the type wheel 20. The notches 57 define a clock track which moves in close proximity to the reading head 58. The periphery of the clock wheel 56 is conventionally magnetized and the variations in the reluctance of the magnetic circuit causes the associated reading head 58 to generate substantially a sine wave output signal. The frequency of this output signal will be directly proportional to the speed of rotation of the shaft 24 and of the output shaft 28 of the motor 26. If the motor 26 slows down, the frequency will be less. If the motor 26 speeds up, the frequency will be greater. The clock signal is used to indicate the start of a printing cycle. The time of travel of the print hammer 36 from its inactive position (when magnet 48 is deenergized) to its active or impact position (with its head 54 impacting an interposed record sheet against the characters 22) is constant.

At the moment of actuation of the print hammer 36, assuming that the type wheel 20 is rotating at a preselected speed, there is complete synchronization between the print hammer 36 and a selected character 22 on the type wheel 20. Should the speed of the type wheel 20 deviate from the preselected speed, the print hammer 36 may no longer be completely synchronized with the selected character 22 on the type wheel 20. When the speed of the type wheel 20 returns to the preselected speed, the print hammer 36 would again be completely synchronized.

FIG. 2 shows the print hammer 36 and type wheel 20 in complete synchronism. FIG. 3 is a view of the print hammer 36 and type wheel 20 out of synchronism, showing the print hammer 36 arriving late at its true impact position. FIG. 4 is a view of the print hammer 36 and type wheel 20 out of synchronism, showing the print hammer 36 arriving ahead of its true impact position. In the FIG. 3 condition, the head 54 of the print hammer 36 hits only the trailing portion of the character **22*a* since the type wheel 20 is rotating faster than the normal or preselected speed at which it is completely synchronized with the print hammer 36. In FIG. 4, the head 54 impacts only the leading portion of the character 22*a* since the type wheel 20 is rotating slower than the normal speed. The present invention compensates for the variations in speed of the type wheel 20 and assures that the head 54 will register with and impact the full face of the type wheel character 22*a* as indicated in FIG. 2, regardless of the speed of rotation of the type wheel 20**.

Figures 5, 7:
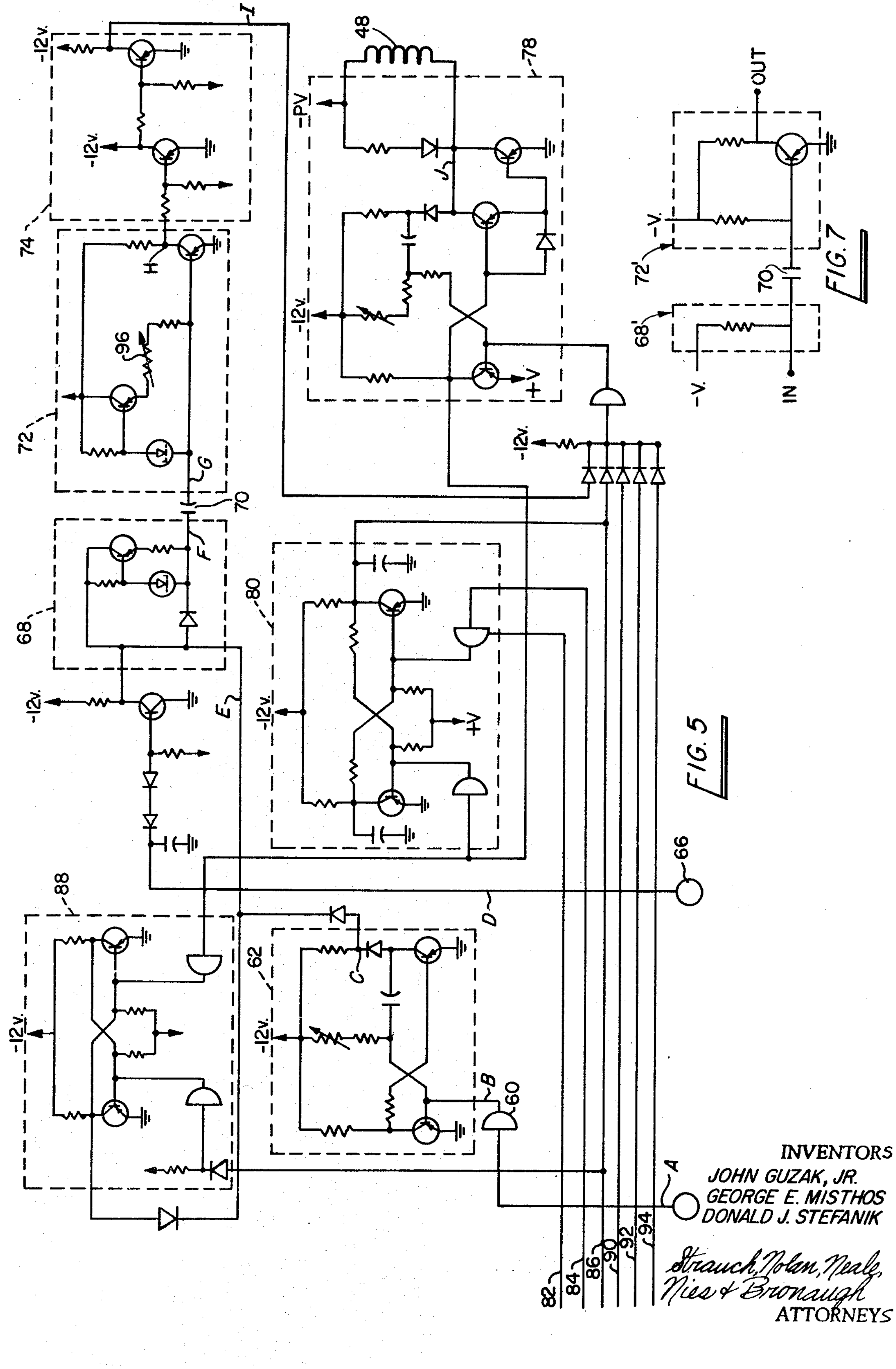
FIG. 5 is a schematic diagram of a circuit embodying the principles of the present invention.
FIG. 7 is a schematic diagram illustrating a fragmentary portion of a modified proportional time delay circuit.

The circuitry by which this composition is effected is illustrated in block form in FIG. 1 and schematically in FIG. 5. The wave forms, which appear at the several successive stages through the circuit, are illustrated in FIG. 6.

Figure 6:
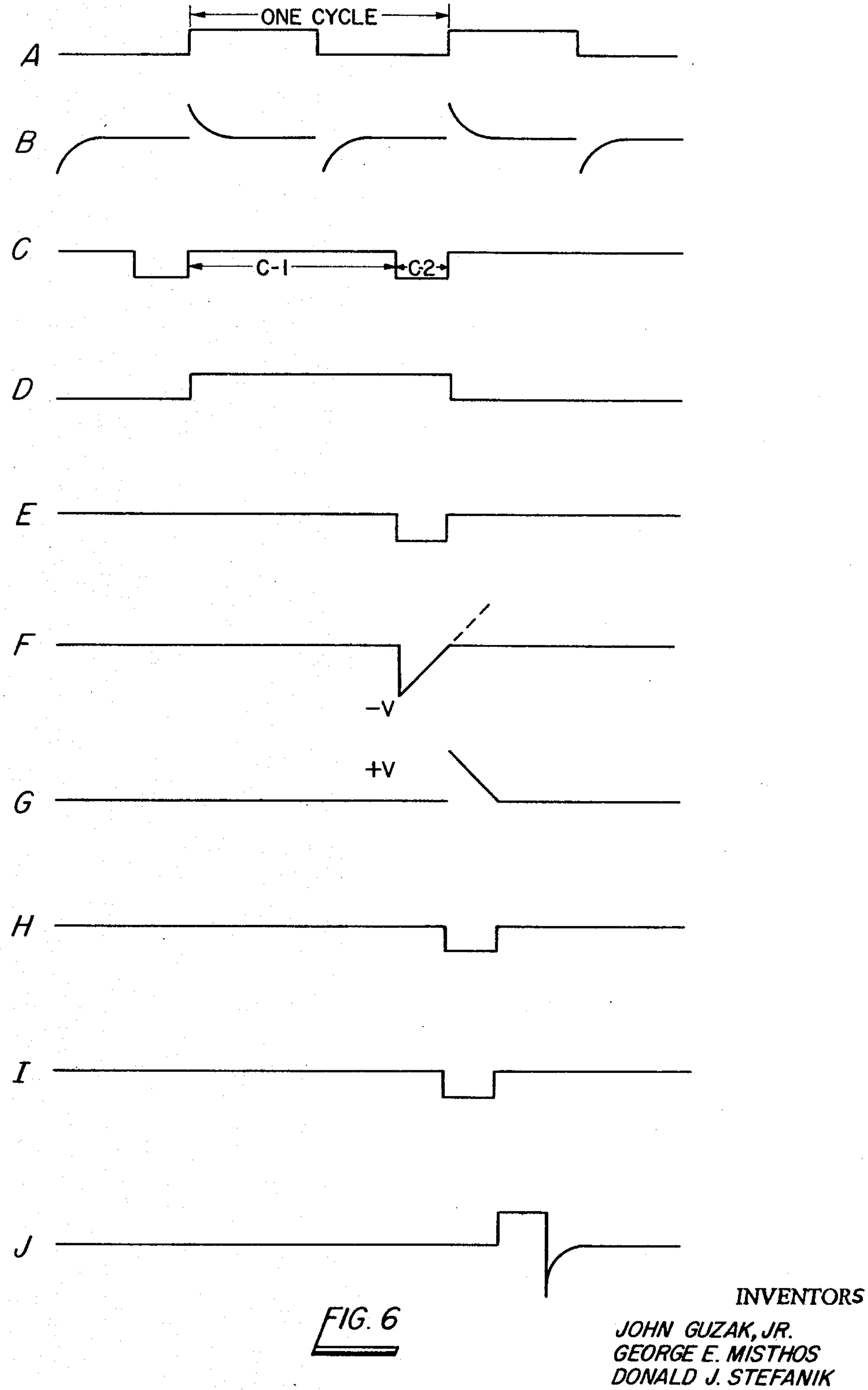
FIG. 6 is a timing diagram illustrating the operation of the circuit of FIG. 5.

The wave form from the reading head 58 is that indicated at A in FIG. 6 and appears in the line indicated at A in FIG. 1. The A signal is fed into a pedestal gate 60, the output of which is indicated at B in FIG. 6. This peaked signal B is fed through a single shot multivibrator delay circuit 62. The output signal from this circuit is indicated at C in FIG. 6. This circuit is constructed so that the duration of the output signal portion C–1 is always of the same duration. Accordingly, the portion C–2 of each cycle of the signal C will vary in duration with respect to the duration of each cycle of signals A and B.

The signal C is fed to one input of a coincidence circuit 64. The other input to this coincidence circuit 64 is the signal D (FIG. 6) appearing on the input terminal 66. The signal D is the print signal. The output signal from the coincidence circuit 64 is the signal E (FIG. 6).

A proportional time delay circuit generally indicated at TD is shown to include a constant current regulator circuit (charge) 68, a capacitor 70, and a constant current regulator circuit (discharge) 72 connected in series with each other.

The signal E is the input to the constant current regulator circuit (charge) 68 controlling the charging rate of the capacitor 70. The charging signal for the capacitor 70 is indicated at F in FIG. 6. The rate of charge of the capacitor 70 is determined by the characteristics of the circuit 68 and the duration of the charging time, and therefore the magnitude of the total charge placed upon the capacitor 70 is determined by the duration of the signal E.

At the end of the charging time as determined by the signal E, the capacitor 70 is discharged through the constant current regulator circuit (discharge) 72. The rate of discharge of the capacitor 70 is controlled by the characteristics of the circuit 72. The discharge of capacitor 70 is indicated by the signal G. For illustrative purposes the charge and discharge times as indicated by the signals F and G are shown to have a one to one ratio. As will be explained presently, this ratio can be varied by adjustment of the components of the circuit 72.

The signal at the output of the constant current regulaor circuit (discharge) 72 is indicated by the signal H. This signal H is fed through an amplifier 74, the output signal of the amplifier 74 being indicated at I. The signal I is fed to a print control circuit including a print one shot driver indicated at 78 the output of which is indicated by the signal J in FIG. 6. The signal J is the signal which is fed to the print magnet 48 to activate the print hammer 36.

Referring to FIG. 6, it is apparent that the duration of each cycle of the signal A is constantly being sensed and a signal portion C–2 developed the duration of which is proportional to the duration of each cycle of the clock signal A. This signal portion C–2 is utilized together with the print signal D. The control signal E determines the duration of and the maximum charge upon the capacitor 70 as indicated by the signal F. In other words, the peak of the signal F will be proportional in magnitude to the duration of a respective cycle of the signal A. This voltage determines the duration of the signal G which occurs at the end of the clock cycle which produced the signals E and F. The duration of the signals G, H, I and J is each proportional to the duration of the preceding clock cycle.

As is apparent the time of energization of the magnet 48 as indicated by the signal J is regulated with respect to the duration of the clock cycle of the signal A. Specifically, from the beginning of a clock cycle there is a time delay of one clock cycle plus a further time interval indicated by the signals G, H and I which is proportional in length to the duration of the preceding clock cycle before the print magnet 48 is energized. If the motor 26 is running faster than its normal speed, the duration of the clock signal A will be shorter. Thus, the duration of the signals G, H and I will be directly proportionately shorter and the print hammer 36 will be activated sooner so that it arrives at the correct position in registry with full face of the selected character as indicated in FIG. 2. Similarly, if the speed of the motor 26 is slower than normal, the duration of each cycle of the signal A is longer than normal. Thus, the duration of the signals G, H and I will be correspondingly increased so that the print hammer 36 will be activated later so that it arrives at the correct time in registry with the selected type character.

FIG. 5 illustrates schematically the details of the foregoing circuit components together with the interrelated register circuits and inputs. As is apparent from FIG. 5, there is associated with the above described components a print detector register 80 to which is supplied three input signals on input leads 82, 84 and 86. These input signals are respectively a "space detector and hammer control" signal, a "print inhibit function" signal and a "print inhibit" signal. Also associated with the above circuitry is a sync register 88 the output of which is connected to the input of the coincidence circuit 64 (FIG. 1). Also connected to the basic circuit as indicated in FIG. 5 along the lines 90, 92 and 94 respectively are "line feed" "carriage return" and "space" signals. These are connected together with the output of the amplifier 74 and the signal along the "print inhibit" lead 86 to the input of the print driver circuit 78.

As indicated previously, the ratio of the duration of the signal G to the duration of the signal F is regulatable as by a variable resistor 96 within the constant current regulator circuit (discharge) 72 as shown in FIG. 5.

As is apparent, the constant current regulator charge and discharge circuits 68 and 72 provide linear wave forms as indicated at F and G.

The constant current regulator charge and discharge circuits 68 and 72 can be replaced by circuits 68' and 72' if desired, as indicated in FIG. 7. For such a circuit the slope of the curves of the wave forms F and G will be exponential curves rather than straight line functions.

What is claimed and desired to be secured by Letters Patent is:

1. In a recording device which is actuated in response to an input signal to produce an intelligible record:

(a) a continuously rotating first recording member subject to variations in speed;

(b) a second recording member mounted for movement in a constant time interval between an inactive rest position and an active position in which it coacts with said first member to produce a record;

(c) means for continuously producing a cyclical signal the duration of the cycles of which is proportional to the rate of rotation of the first member;

(d) means for producing an input signal synchronized with said first recording member; and (e) means responsive to both of said signals and operative after elapse of a time interval which is dependent in magnitude on the duration of the cycles of the cyclical signal to initiate movement of said second member from its rest position toward its active position.

2. The device as defined in claim 1, wherein said means responsive to both of said signals includes a proportional time delay circuit.

3. The device defined in claim 1 wherein said first member is a type wheel, wherein said second member is a print hammer, and wherein said print hammer is pivotally mounted for movement to impact the indicia bearing surface of said wheel at its said active position.

4. The device defined in claim 3 further comprising means resiliently biasing said hammer toward its said inactive position, and wherein said movement initiating means includes electromagnetic means for driving said hammer from its inactive position to its active position.

5. The device defined in claim 3 wherein said cyclical signal producing means comprises a clock track rotating in synchronism with said type wheel and electromagnetic pickup means coacting therewith.

6. The device defined in claim 1 wherein said last named means comprises a capacitor, means responsive to both said input and said cyclical signals for charging said capacitor to a value proportional to the time of said cyclical signals, means for initiating discharge of said capacitor after it has reached such value, and means for producing a further signal after discharge of said capacitor to actuate said second member.

7. The device defined in claim 6 wherein said capacitor charging means comprises a multivibrator circuit actuated in synchronism with said cyclical signal and operative to produce an asymmetrical square wave output signal the first portion of which is of constant duration and the remaining portion of which varies in duration, with respect to variations in the duration of the cycles of said cyclical signal, coincidence means responsive to said input signal and to the second portion of said square wave output signal to charge said capacitor whereby the charge upon said capacitor at the end of said square wave output signal is dependent upon the duration of the cycles of said cyclical signal.

8. The device defined in claim 7 wherein the charging circuit for said capacitor includes a constant current regulator.

9. The device defined in claim 8 wherein the discharge circuit for said capacitor includes a constant current regulator.

10. The device defined in claim 7 wherein the discharge circuit for said capacitor includes a constant current regulator.

11. The device defined in claim 6 including variable means in the discharge circuit for said capacitor for controlling the discharge rate of said capacitor.

12. In a device for producing an intelligible record: recording elements movable in a path, means, subject to deviations in speed, for moving said elements at a preselected speed, a recording member movable from an inactive position to an active position with respect to a selected recording element for producing a record, means for producing an input signal synchronized with the movement of said recording elements, and means for synchronizing the time of actuation of the recording member with respect to the position of a selected recording element including means for continuously sensing deviations in speed from the preselected speed of the recording elements and means responsive to said sensing means and to said input signal for continuously and automatically regulating the time of initiation of actuation of the recording member in proportion to the magnitude of any speed deviations.

13. In a device as claimed in claim 12 wherein said regulating means includes a proportional time delay circuit.

14. In a device as claimed in claim 12 wherein said regulating means includes constant current charge and discharge circuits connected by a capacitor.

15. Method of producing an intelligible record comprising the steps of: moving recording elements in a path at a preselected speed, moving a recording member from an inactive position to an active position with respect to a selected recording element to produce a record, producing an input signal synchronized with the movement of the recording elements, and synchronizing the time of actuation of the recording member with respect to the position of a selected recording element by continuously sensing deviations in speed from the preselected speed of the recording elements and continuously and automatically regulating the time of initiation of actuation of the recording member upon the occurrence of an input signal and in dependence on the magnitude of sensed speed deviations.

References Cited

UNITED STATES PATENTS

| | | | |
|---|---|---|---|
| 2,692,551 | 10/1954 | Potter | 178—23 |
| 3,215,778 | 11/1965 | Abramson | 178—23 |

JOHN W. CALDWELL, Primary Examiner

M. M. CURTIS, Assistant Examiner

U.S. Cl. X.R.

101—93; 178—28, 38